Patented Mar. 24, 1936

2,034,833

UNITED STATES PATENT OFFICE 2,034,833

METHOD OF TREATING ORGANIC WASTE LIQUORS

Erik Ludvig Rinman, Djursholm, Sweden

No Drawing. Application September 19, 1934, Serial No. 744,686. In Sweden September 22, 1933

6 Claims. (Cl. 202—34)

In my prior U. S. Patent No. 1,906,102 I have described a method of alkalizing the waste liquors from the soda or sulphate pulp manufacture for the purpose of making them suitable for dry distillation, according to which method said alkalization may be effected, inter alia, by adding oxides of barium and calcium in a pulverulent state to the strongly concentrated hot waste liquor, so that a reaction sets in as a result of which a pulverulent mass is formed which is directly ready for dry distillation. According to my said method the said waste liquors may be transformed into a pulverulent state and may simultaneously be given an alkalinity which renders it possible to obtain a great yield of chemical products during the dry distillation of the powder obtained.

My present invention relates to an improvement in my said earlier method whereby not only the waste liquors from the soda or sulphate pulp manufacture but also other alkaline organic waste liquors may be transformed into an alkalized powder which, when dry distilled, gives a considerably increased yield of valuable chemical products, and at the same time the present method also provides other practical advantages.

My improved method consists principally in introducing the waste liquor to be treated in a concentrated state, and preferably also in a hot state, into a mixture of barium oxide, or barium hydroxide, and calcium oxide in a pulverulent state, which mixture is maintained in a lively movement, and which should also preferably be in a hot state, the introduction of the waste liquor into the said mixture of chemicals being effected so slowly that the water contained in the waste liquor has time to evaporate owing to the chemical reaction set in between the liquor and the mixture of chemicals and, optionally, by the aid of additional heat supplied, so that the mixture of chemicals as well as the dry substance of the waste liquor remain in a pulverulent state. If the liquor introduced is heated to the temperature suitable for the reaction, which temperature generally lies between 100° and 110° C., and if the chemicals are also heated to the same temperature, a practically instantaneous reaction is set in when the liquor is introduced, which reaction becomes molecular, so to speak, inasmuch as the reaction product obtained forms a very fine powder. This chemical reaction, therefore, produces a quite different effect than when, as previously proposed, the chemicals are introduced into the liquor which is kept in motion. In the latter case liquor as well as chemicals become occluded to a certain extent.

For facilitating the carrying out of the reaction it is suitable to introduce the concentrated waste liquor in a finely distributed state into the mixture of chemicals, for instance, by forcing the liquor under pressure through one or more spraying nozzles or similar distributing means.

In this way the reaction may be carried through very rapidly. For instance, it has been established by tests that it requires about 7 minutes for transforming in this manner 10 kg. of a 40 to 50 per cent soda pulp waste liquor to powder, by introducing this quantity of liquor in a hot state during 5 minutes in a hot pulverulent mixture of chemicals weighing 5 kg. and which is maintained in a lively movement in a mixing apparatus provided with a steam jacket. The heat generated during the reaction, together with the heat supplied from the steam jacket, liberates about 4 kg. water in the state of steam.

Since large quantities of steam are thus generated during this reaction, it is obvious that such steam should preferably be brought to good use. This is most easily accomplished if the steam is obtained free from air which may be attained by spraying the waste liquor, or introducing it in other manner, without admitting air into a closed mixing apparatus from which the air has previously been expelled by means of steam. In practice this may most easily be accomplished by performing the reaction in a mixing apparatus which is adapted to continuous operation. For this purpose it is suitable to use a long mixing apparatus into one end of which the chemicals are introduced, after which they are fed, while lively stirred, towards the other end of the apparatus, the hot waste liquor being sprayed into the mixing apparatus at a suitable number of places and in a quantity suited to the quantity of chemicals and with such rate of speed that the mass in the mixing apparatus retains its pulverulent state during the entire operation.

The pulverulent product formed during the reaction and the generated steam may be discharged at the same end of the mixing apparatus through suitable means.

Since the powder formed during the reaction is intended to be introduced, immediately and without being cooled, into a continuously operating rotary dry distillation furnace, it is suitable to arrange the mixing apparatus in such manner that the powder formed during the reaction is directly transferred from the said apparatus to the said furnace. Since in practice the dry distillation requires at least an equally large quantity of steam as that formed during the reaction in the mixing apparatus, this last mentioned steam may suitably be allowed to follow the powder into the dry distillation furnace. In this way the advantage is obtained that powder possibly carried away by the steam follows the latter into the distillation furnace.

The method above described of mixing the waste liquor with the chemicals provides the advantage that a very fine powder is obtained, and that the manner of operation is so safe that a continuous operation may be had without risk of danger, and an advantageous use of the steam generated in the mixing apparatus during the reaction. The method also provides the great advantage that the powder formed in the mixing apparatus gives during the dry distillation a considerably increased yield, particularly of the most valuable products.

During the dry distillation an increased yield of hydrogen is also obtained, and in practice it is therefore important that said gas be freed from all volatile valuable condensable substances, such as hydrocarbons, acetone, and so forth, by washing in scrubbers with chemically active carbon.

In other respects the dry distillation operation, the treatment of the distillate formed during the same, the recovery of caustic soda lye from the dry distillation residue, and the burning of the sludge then obtained, may be carried out in accordance with methods previously described. For the purpose of illustrating the practical application of the method, however, an example will now be given of a manner in which it may be carried out.

A suitable depth of the layer of the mixture of chemicals in the mixing apparatus is 1 to 3 dm. when the powder is assumed to be at rest. When the stirring device of the mixing apparatus maintains the chemicals in movement the said depth is of course increased. It is still more increased during the course of operation, however, since the powder formed during the reaction has a specific gravity of about 0.8 to 1.0 only, if its content of moisture has been decreased to 10 per cent or less.

The mixing apparatus used may have a length of about 10 meters, for instance, and may be provided with a double stirring device, the two stirrers being designed in such manner that they throw the powder against the center line of the mixing apparatus and simultaneously feed the same from one end of the apparatus towards the other at such rate of speed that the transport of the powder through the mixing apparatus requires a time of about 20 minutes when the depth of the mixture of chemicals is 1.5 dm. The liquor may suitably be introduced into the mixing apparatus through a number of spray nozzles located in a row at a distance of 1 m. from one another, taken from the entrance end for the chemicals. The opposite end of the mixing apparatus is in direct communication with a conveyer which feeds the powder to the dry distillation furnace, and the steam generated in the mixing apparatus is allowed to follow the powder into the furnace.

If a waste liquor is to be treated which is obtained in the manufacture of kraft pulp from wood according to the soda lye process, the operation may be carried out in the following manner. For each ton kraft pulp produced approximately 3300 kg. waste liquor, concentrated to 48 per cent dry substance, is obtained. This waste liquor is sprayed in the manner above stated into the continuously operating mixing apparatus in which it is taken up by a quantity of chemicals of 1850 kg., which may be a mixture of equal parts by weight of barium oxide and calcium oxide, or barium hydroxide and calcium oxide.

It is better, however, to use a mixture having a sufficient excess of calcium oxide to produce the desired alkalinity of the fresh liquor obtained by leaching out the dry distillation residue with water. In the present case a mixture may be used of 800 kg. BaO and 1050 kg. CaO. During the reaction approximately 1400 kg. steam and about 3800 kg. powder are then formed, the latter having a volume of about 3800 l. During the following dry distillation of this quantity of powder about 200 l. acetone, methyl alcohol, methyl-ethyl ketone, isopropyl alcohol, and other alcohols are obtained, whereas, if the reaction is carried out according to the old method, only about 150 l. products of a more valuable kind are obtained.

If a sulphate cellulose waste liquor is treated, approximately the same quantities of powder and chemical products as those above stated, are obtained. In such case, however, the products are slightly contaminated by methyl sulphide. This quantity of methyl sulphide may be held comparatively low, however, if care is taken that the mixture of chemicals used in the mixing apparatus contains a suitable quantity of barium superoxide. This may easily be attained by effecting the cooling of the burnt mixture of barium oxide and calcium oxide with a suitable quantity of air. Again, if it is not desired to obtain barium superoxide in the mixture of chemicals, the mixture of barium oxide and calcium oxide must be cooled down from the burning temperature by means of indirect cooling. In such case all bivalent sulphur is retained as such during the mixing, and this also applies to the dry distillation.

If at the end of the dry distillation operation the temperature is maintained between 500° C. and 600° C. during a sufficient length of time, all barium sulphate will also be reduced to barium sulphide, so that in this manner a dry distillation residue is obtained from which all sulphur is obtained as $Na_2S$ when caustic soda lye is prepared from said residue. The mixing as well as the dry distillation thus run a normal course also when there is sodium sulphide present in the waste liquor. The gas formed during the dry distillation is free of smell provided that the gas is first freed from ammonia and then from other chemical products by it being forced to pass through a layer of chemically active carbon which will then completely absorb hydrogen sulphide as well as methyl sulphide, methyl mercaptan and, of course, also acetone and all other products having a higher boiling point.

When treating sulphate cellulose waste liquor, however, the complication arises that all sulphuric acid remaining from the stated reactions is combined with the barium oxide when fresh liquor is prepared from the retort residue, provided that the required quantity of barium oxide and calcium oxide has been added. The barium sulphate formed in this manner may easily be removed, however, when burning the sludge obtained after separation of the liquor, which sludge otherwise consists of barium carbonate, calcium carbonate, and carbon, by performing the burning in two steps.

During the first step the sludge is burnt at a temperature of up to about 1000° C. in the presence of steam and carbon dioxide, so that all sulphur is driven off in the state of hydrogen sulphide, provided that the burning is effected with a slightly reducing flame. This step of the burning gives a mixture of calcium oxide and barium carbonate which is free from sulphur. This mixture is then burnt with a fuel poor in hydrogen, this second burning giving barium oxide and calcium oxide to be used again in the process.

It is also possible to perform the burning of the said sludge which consists of barium carbonate, calcium carbonate, barium sulphate, and carbon, in one and the same furnace if the burning is carried out without excess of air but in the presence of a suitable quantity of steam. The burning may also be carried out in such manner that the temperature is only increased to about 1200° C. in the presence of steam and slightly reducing fuel gases. The final product then obtained is a mixture of calcium oxide and barium hydroxide which may also be used for mixing with the waste liquor.

It is also possible according to the present method to treat waste liquors which have been obtained by completely digesting all kinds of vegetable substances, such as wood waste, coffee, and so forth, with caustic soda lye, or with a lye obtained from caustic soda and lime, a mixture of barium hydroxide and calcium hydroxide, or mixtures of these substances.

All of these waste liquors, when mixed with the mixture of chemicals in the manner above set forth, give without difficulty a dry powder. Also from molasses, if boiled with caustic soda lye or with a mixture of barium hydroxide and calcium hydroxide, a waste liquor is obtained which when treated in the manner above set forth, gives a dry powder which, when dry distilled, gives similar chemical products. This is also the case as regards a sulphite waste liquor having sodium, calcium, or magnesium, as a base, if, before mixing it with the chemicals, it is boiled with alkalies in the same manner as the molasses, or with soda and calcium hydroxide, and optionally, with an addition of sawdust, with subsequent separation of calcium carbonate, calcium sulphite, and lignin-lime and possibly remaining saw-dust. A liquor is then obtained which may be treated in the same manner as a sulphate cellulose waste liquor. There is this difference, however, from the manner of operation when dry distilling a sulphate waste liquor, that when dry distilling a sulphite waste liquor the temperature must be maintained between 500° and 600° C. during such length of time that practically speaking all sulphur is removed as gaseous hydrogen sulphide, whereas when dry distilling a sulphate waste liquor the heating is only carried so far that all sulphur is recovered in a bivalent state but combined with Na and Ba.

With the method above described it is also possible to employ oil-containing waste liquors, for instance those obtained by digestion under high pressure, since also such waste liquors give a dry powder if they are mixed with the chemicals in the manner above described.

It will be understood from the above description that according to the present process a complete control of the sulphur is attained. Therefore, if it is desired to increase the sulphur content in the recovered fresh liquor, lost soda may be replaced by sodium sulphate. Care should only be taken that such sulphate is introduced into the process previous to the dry distillation in the state of barium sulphate. The dry distillation of a sulphate waste liquor should be carried out in such manner that the sulphur remains in a bivalent state in the dry distillation residue, and such sulphur as may have distilled over in the state of $H_2S$ should be absorbed in a fresh lye so that it is again utilized. Again, in the case of a sulphite waste liquor it is suitable to finish the dry distillation operation with a special distillation in the presence of steam at 550° to 600° C. so that practically all sulphur is driven off in the state of hydrogen sulphide which may be burnt to sulphur dioxide.

Since, as above stated, barium hydroxide may be used instead of barium oxide, the term "barium oxide" used in the claims should be understood as being equivalent to barium hydroxide.

I claim:

1. The method of treating alkaline organic waste liquors in which the organic matter is present in the state of organic salts, which comprises introducing the waste liquor in a concentrated state into a dry pulverulent mixture of barium oxide and calcium oxide so as to cause a reaction between said chemicals and the water in the liquor, whereby heat is generated, maintaining said mixture of dry chemicals in a lively movement during the introduction of the liquor therein, performing the introduction of the waste liquor into said mixture so slowly that evaporation of excess water in the liquor is effected by the heat generated at substantially the same rate as the liquor is introduced leaving a dry pulverulent residue of chemicals and dry substance contained in the waste liquor, and subjecting said residue to dry distillation.

2. The method of treating alkaline organic waste liquors in which the organic matter is present in the state of organic salts, which comprises introducing the waste liquor in a hot concentrated state into a hot dry pulverulent mixture of barium oxide and calcium oxide so as to cause a reaction between said chemicals and the water in the liquor whereby heat is generated, maintaining said mixture of dry chemicals in a lively movement during the introduction of the liquor therein, performing the introduction of the waste liquor into said mixture so slowly that excess water in the liquor is successively evaporated by the heat generated according as the liquor is introduced leaving a dry pulverulent residue of chemicals and dry substance contained in the waste liquor, and subjecting said residue to dry distillation.

3. The method of treating alkaline organic waste liquors in which the organic matter is present in the state of organic salts, which comprises introducing the waste liquor in a hot concentrated state into a hot dry pulverulent mixture of barium oxide and calcium oxide so as to cause a reaction between said chemicals and the water in the liquor whereby heat is generated, maintaining said mixture of dry chemicals in a lively movement during the introduction of the liquor therein, supplying additional heat to said mixture of chemicals during the introduction of the liquor therein, performing the introduction of the waste liquor into said mixture so slowly that evaporation of excess water in the liquor is effected by the heat generated at substantially the same rate as the liquor is introduced leaving a dry pulverulent residue of chemicals and dry substance contained in the waste liquor, and subjecting said residue to dry distillation.

4. The method of treating alkaline organic waste liquors in which the organic matter is present in the state of organic salts, which comprises introducing the waste liquor in a hot concentrated and finely distributed state into a hot dry pulverulent mixture of barium oxide and calcium oxide so as to cause a reaction between said chemicals and the water in the liquor whereby heat is generated, maintaining said mixture of dry chemicals in a lively movement during the introduction of the liquor therein, performing the introduction of the waste liquor into said mixture so slowly that excess water in the liquor is successively evaporated by the heat generated according as the liquor is introduced leaving a dry pulverulent residue of chemicals and dry substance contained in the waste liquor, and subjecting said residue to dry distillation.

5. The method of treating alkaline organic waste liquors in which the organic matter is present in the state of organic salts, which comprises introducing the waste liquor in a hot concentrated and finely distributed state into a hot dry pulverulent mixture of barium oxide and calcium oxide so as to cause a reaction between said chemicals and the water in the liquor whereby heat is generated, maintaining said mixture of dry chemicals in a lively movement during the introduction of the liquor therein, supplying additional heat to said mixture of chemicals during the introduction of the liquor therein, performing the introduction of the waste liquor into said mixture so slowly that evaporation of excess water in the liquor is effected by the heat generated at substantially the same rate as the liquor is introduced leaving a dry pulverulent residue of chemicals and dry substance contained in the waste liquor, and subjecting said residue to dry distillation.

6. The method of treating alkaline organic waste liquors in which the organic matter is present in the state of organic salts, which comprises introducing a hot dry pulverulent mixture of barium oxide and calcium oxide without admission of air into a closed mixing apparatus, maintaining said mixture of chemicals in a lively movement in said mixing apparatus, introducing the waste liquor in a hot concentrated and finely distributed state into said hot dry pulverulent mixture of chemicals in said mixing apparatus so as to cause a reaction between said chemicals and the water in the liquor whereby heat is generated, supplying additional heat to said mixture of chemicals in said mixing apparatus, performing the introduction of the waste liquor into said mixture in said mixing apparatus without admission of air and so slowly that excess water in the liquor is successively evaporated to steam free from air by the heat generated according as the liquor is introduced leaving a dry pulverulent residue of chemicals and dry substance contained in the waste liquor, and subjecting said residue to dry distillation in the presence of the steam evaporated.

ERIK LUDVIG RINMAN.